| United States Patent [19] | [11] Patent Number: 5,075,179 |
|---|---|
| Lehner et al. | [45] Date of Patent: Dec. 24, 1991 |

[54] MAGNETIC RECORDING MEDIA

[75] Inventors: August Lehner, Roedersheim-Gronau; Rudolf Suettinger, Heidelberg; Michael Bobrich, Boehl-Iggelheim; Hermann Dikow, Hockenheim; Hermann Roller, Ludwigshafen; Werner Lenz, Bad Durkheim; Ludwig Kreitner, Heppenheim; Werner Loch, Erpolzheim; Norbert Schneider, Altrip, all of Fed. Rep. of Germany

[73] Assignee: BASF Aktiengesellschaft, Ludwigshafen, Fed. Rep. of Germany

[21] Appl. No.: 448,893

[22] Filed: Dec. 12, 1989

[30] Foreign Application Priority Data

Dec. 23, 1988 [DE] Fed. Rep. of Germany ....... 3843442

[51] Int. Cl.$^5$ ............................................. G11B 23/00
[52] U.S. Cl. .................................. 428/694; 428/329; 428/900
[58] Field of Search ................ 428/694, 900, 323, 329

[56] References Cited

U.S. PATENT DOCUMENTS

| 2,871,128 | 1/1959 | Schollenberger . | |
|---|---|---|---|
| 3,512,930 | 5/1970 | Bottjer et al. . | |
| 3,686,031 | 8/1972 | Balthis . | |
| 3,687,726 | 8/1972 | Pye . | |
| 3,767,580 | 10/1973 | Kitamoto et al. . | |
| 3,819,411 | 6/1974 | Kitamoto et al. . | |
| 4,847,156 | 7/1989 | Nishikawa et al. | 428/694 |
| 4,876,149 | 10/1989 | Ramharaik | 428/694 |
| 4,880,692 | 11/1989 | Ryoke et al. | 428/694 |
| 4,885,208 | 12/1989 | Araki et al. | 428/694 |
| 4,886,703 | 12/1989 | Hasumi et al. | 428/694 |
| 4,895,764 | 1/1990 | Lehner et al. | 428/694 |
| 4,900,631 | 12/1990 | Yamakawa et al. | 428/694 |
| 4,937,098 | 6/1990 | Nishikawa et al. | 428/694 |
| 4,943,479 | 7/1990 | Yamada et al. | 428/694 |

*Primary Examiner*—Paul J. Thibodeau
*Attorney, Agent, or Firm*—Keil & Weinkauf

[57] ABSTRACT

Magnetic recording media consist of a nonmagnetic substrate and one or more magnetizable layers which are firmly applied thereon and are based on a magnetic material which is finely dispersed in a polymer binder and further conventional additives and essentially consists of ferromagnetic chromium dioxide, and the said recording media are particularly stable to the chemical decomposition due to moisture and oxidizable compounds and hence to deterioration in the magnetic properties, owing to the addition of from 0.1 to 8% by weight of an organic compound from the group consisting of the antioxidants, based on the amount of chromium dioxide, to the magnetic layer.

2 Claims, No Drawings

MAGNETIC RECORDING MEDIA

The present invention relates to magnetic recording media consisting of a nonmagnetic substrate and one or more magnetizable layers which are firmly applied thereon and are based on a magnetic material which is finely dispersed in a polymer binder and further conventional additives and essentially consists of ferromagnetic chromium dioxide and is particularly stable to the chemical decomposition due to moisture and oxidizable compounds and hence to deterioration in the magnetic properties.

Acicular, ferromagnetic chromium dioxide, its preparation and the use of this material for magnetic recording media have often been described. Magnetic recording media which contain chromium dioxide generally have superior magnetic properties compared with recording media based on other magnetic oxides.

However, it is also known that the magnetic properties of recording media containing chromium dioxide deteriorate in the course of time. Ferromagnetic chromium dioxide in powder form is substantially stable in the absence of moisture and there is furthermore no detectable change in the magnetic properties over a long time. However, it has been observed that chromium dioxide can be attacked both by water and by other materials, for example the organic polymer binders used in the preparation of magnetic recording media, with decomposition to give nonmagnetic components. In the case of magnetic recording media, this means not only a loss of magnetic and hence electroacoustic properties but also an adverse effect on the mechanical properties. This deterioration is further accelerated at relatively high temperatures. There has therefore been no lack of attempts to overcome these disadvantages. For example, U.S. Pat. No. 3,512,930 describes the treatment of chromium dioxide powder with a reducing agent. In other processes, alumina coatings (U.S. Pat. No. 3,687,726) or those consisting of sparingly soluble metal phosphates (U.S. Pat. No. 3,686,031) are produced. The application of metal compounds whose cations are capable of forming sparingly soluble chromates has also been disclosed (DE-B 21 52 331). JA-A-21200/76 proposes applying magnetic iron oxides to the surface in order to coat the chromium dioxide particles, while DE-A-27 49 757 describes the application of iron (III)-containing oxidic precipitates to the chromium dioxide. EP-B 0078042 describes a stabilization process in which metals, e.g. iron, zinc, cobalt or manganese, are incorporated into the surface of the chromium dioxide particles. Attempts have also been made to increase the stability merely by subjecting the chromium dioxide to a heat treatment in an inert gas atmosphere (EP-B 0029687) or in air (EP-B 0248402). However, all these processes have the disadvantage that the magnetic properties of the treated chromium dioxide materials are greatly reduced due to a non-magnetic surface layer which is achieved either by coating with foreign compounds or by means of a decomposition layer, and the recording media produced using the chromium dioxide materials obtained by these processes nevertheless do not have sufficient long-term stability to meet the present requirements in particular in the electronic computing sector. Furthermore, the attempts to stabilize magnetic recording media containing chromium dioxide by the addition of ionic compounds whose cation forms a sparingly soluble chromate directly to the dispersion, as proposed in, inter alia, DE-A 21 62 332, did not give sufficient stability, in particular the required long-term stability.

It is an object of the present invention to provide magnetic recording media containing chromium dioxide which, without significant deterioration in the magnetic properties, have improved stability to the chemical decomposition due to moisture and oxidizable, generally organic compounds and thus ensure the required long-term stability of the magnetic recording.

We have found that this object is achieved by a magnetic recording medium consisting of a nonmagnetic substrate and at least one magnetizable layer which is firmly applied thereon and is based on a magnetic material which is finely dispersed in a polymer binder and further conventional additives and essentially consists of ferromagnetic chromium dioxide, if the magnetizable layer additionally contains from 0.1 to 8% by weight, based on the amount of chromium dioxide, of an organic compound from the group consisting of the sterically hindered phenols, cresols, aromatic amines, benzotriazoles, triazine derivatives, esters of phosphorus-containing acids, phenolic phosphoric esters, their metal salts, benzophenones, substituted phenyl benzoates and alkyl esters of thio acids.

Examples of the compounds added to the novel recording medium are:

phenyl-α-naphthylamines, N-isopropyl-N'-phenyl-p-phenylenediamine, N-(1,3-dimethylbutyl)-N-phenyl-p-phenylenediamine, N,N'-di-(1,4-dimethylphenyl)-p-phenylenediamine, 2,2,4-trimethyl-1,2-dihydro-6-ethoxyquinoline, phenylene-α-naphthylamine, condensate of an alcohol and α-naphthylamine, di-β-naphthyl-p-phenylenediamine, disalicylideme-N-methyldiisopropylenediamine, benzofuran derivatives, 2,2'-methylenebis-(4-methyl-6-tert-butylphenol), N,N'-di-sec-butyl-p-phenylenediamine, 2,2-methylenebis-(4-methyl-6-cyclohexylphenol), 4,4'-dihydroxybiphenyl, 2-mercaptobenzimidazole, zinc salt of 2-mercaptobenzimidazole, Al salt of N-nitrosocyclohexylhydroxylamine, K salt of N-nitrosocyclohexylhydroxylamine, 2,6-di-tert-butyl-p-cresol, hexane-1,6-diol bis-3-(3,5-di-tert-butyl-4-hydroxyphenyl)-propionate, calcium 3,5-di-tert-butyl-4-hydroxybenzylmonoethylphosphonate, 1,3,5-trimethyl-2,4,6-tris-(3,5-di-tert-butyl-4-hydroxybenzyl)-benzene, 1,1,3-tris-(5-tert-butyl-4-hydroxy-2-methylphenyl)-butane, 1,3,5-tris-(3,5-di-tert-butyl-3-methylphenol), 4,4'-thiobis-(6-tert-butyl-3-methylphenol), 1,1'-thiobis-(2-naphthol), 2,2'-methylenebis-(6-tert-butyl-4-methylphenol), tris-(nonylphenyl) phosphite, 2,2'-thiodiethyl bis-[3-(3,5-di-tert-butyl-4-hydroxyphenyl)-propionate], octadecyl 3-(3,5-di-tert-butyl-4-hydroxyphenyl) propionate, 1-phospha-2,6,7-trioxabicyclo[2.2.2]-oct-4-ylmethyl 3,5-di-tert-butyl-4-hydroxyphenylpropionate/zinc stearate, dilauryl thiodipropionate, di-(alkoxyanilide) oxalate, N,N'-diacetyladipic acid dihydrazide, N,N'-dibenzaloxalic acid dihydrazide, 2-(2-hydroxy-5-methylphenyl)-2H-benzotriazole, 2-(2-hydroxy-3,5-di-tert-butylphenyl)-2H-benzotriazole, 2-(2-hydroxy-3,5-di-tert-amylphenyl)-2H-benzotriazole, 1,1'-thiobis-(2-naphthol), 1,3,5-trimethyl-2,4,6-tris-(3,5-di-tert-butyl-4-hydroxybenzyl)-benzene, 1,1,5-tris-(5-tert-butyl-4-hydroxy-2-methylphenyl)-butane, mixture of tris-(nonylphenyl) phosphite and 3-methyl-4,6-bis-α- methylbenzylphenol, 3-methyl-4,6-bis-α-methylbenzylphenol, 2,2'-methylenebis-(6-tert-butyl-4-methylphenol), 4,4'-butylidenebis-(6-tert-butyl-3-methylphenol), 2,6-di-tert-butyl-p-cresol, tris-(nonylphenyl) phosphite, 4,4'-thiobis-(6-tert-butyl-3-methylphenol), pentaerythrityl tetrakis-[3-(3,5-di-tert-butyl-4-hydroxyphenyl)-propionate], octadecyl 3-(3,5-di-tert-butyl-4-hydroxyphenyl)-propionate, 2-ethyl-n-hexyl S-(3,5-di-tert-butyl-4-hydroxybenzyl)-thioglycolate, bis-(2,2,6,6-tetramethyl-4-piperidyl)sebacate, molecular weight: 481 N,N'-bis-[3-(3',5'-di-tert-butyl-4'-hydroxyphenyl)-propionyl]-hydrazine, 2,4-bis-(n-octylthio)-6-(4-hydroxy-3,5-di-tert-butyl-anilino)-1,3,5-triazine, triethylene glycol bis-3-(3-tert-butyl-4-hydroxy-5-methylphenyl)-propionate, N,N'-hexamethylenebis-(3,5-di-tert-butyl-4-hydroxyhydrocinnamide), diethyl 3,5-di-tert-butyl-4-hydroxybenzylphosphonate, lauryl $\beta,\beta'$-thiodipropionate, myristyl $\beta,\beta'$-thiodipropionate or distearyl $\beta,\beta'$-thiodipropionate.

These compounds are added in an amount of from 0.1 to 8, in particular from 0.2 to 4, % by weight, based on the amount of magnetic material, during the preparation of the dispersion forming the magnetic layer. However, it is also possible to treat the magnetic material with the stated compounds before introduction into this dispersing process. Preferably, however, the addition is effected before or during dispersing. This allows additional use to be made of a dispersing action and a good, uniform distribution can be achieved. If the magnetic layer is produced using other conventional additives which, in addition to having other effects, such as improving the frictional properties and leveling, also promote dispersing, the advantageous properties are fully retained when the stabilizer is added.

A suitable magnetic material essentially consisting of chromium dioxide is finely divided, acicular chromium dioxide having a mean particle length of from 0.1 to 2, in particular from 0.1 to 0.9 $\mu$m, alone or as a mixture with not more than 40% by weight of ferrimagnetic iron oxides, especially acicular gamma-iron(III) oxide and cobalt-modified gamma-iron(III) oxide. When the magnetic iron oxides used were those of the bertholide type, it was found that the polyunsaturated compounds present in the magnetic layer of the novel recording media also effect stabilization with respect to the iron-(II) content which can be changed by oxidation.

Suitable binders for dispersing the finely divided magnetic material are the binders known for the preparation of magnetic layers, such as a copolyamide which is soluble in conventional solvents, a polyvinylformal, a polyurethane elastomer, mixtures of polyisocyanates and fairly high molecular weight polyhydroxy compounds or vinyl chloride polymers containing more than 60% of vinyl chloride molecular building blocks, for example a vinyl chloride copolymer with one or more comonomers, such as a vinyl ester of a monocarboxylic acid of 2 to 9 carbon atoms, or an ester of an aliphatic alcohol of 1 to 9 carbon atoms and of an ethylenically unsaturated carboxylic acid of 3 to 5 carbon atoms, such as the esters of acrylic acid, methacrylic acid or maleic acid, or a copolymer of vinyl chloride with one or more of these carboxylic acids themselves as comonomers or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol or 4-hydroxybutyl or 2-hydroxyethyl (meth)acrylate.

Preferably used polyurethane elastomer binders are commercial elastomeric polyester urethanes obtained from adipic acid, butane-1,4-diol and 4,4'-diisocyanatodiphenylmethane, as described in, for example, German Published Application DAS 1,106,959 or German Published Application DAS 2,753,694. The polyurethanes can be used as the sole binder but is preferably used as a mixture with other polymers, for example polyvinylformal, a phenoxy resin or a PVC copolymer. Preferably from 5 to 40% of the second binder component are added. Any crosslinking of the magnetic recording medium which may be required depending on the binder system and the property profile of the tape is effected by reacting the polyurethanes or polyurethane binder mixtures with polyisocyanates. Many organic di-, tri- or polyisocyanates or isocyanates prepolymers having a molecular weight of up to 10,000, preferably from 500 to 3,000, can be used for the crosslinking. Polyisocyanates which carry more than 2 NCO groups per molecule are preferred. Polyisocyanates based on toluylene diisocyanate, hexamethylene diisocyanate or isophorone diisocyanate, which are formed by polyaddition with di- or triols by biuret and isocyanurate formation, have proven particularly suitable. An adduct of toluylene diisocyanate with trimethylolpropane and diethylene glycol is particularly advantageous. The amount of polyisocyanate may vary very considerably depending on the binder system. OH-containing polyureaurethane binders which are crosslinked with polyisocyanate and in which the OH-containing polyureaurethane is obtained by reacting a polydiol, a diol and a primary or secondary amino alcohol and, if required, a triol with a diisocyanate are also advantageous.

Preferably used solvents are water, cyclic ethers, such as tetrahydrofuran and dioxane, and cyclic ketones, such as cyclohexanone. Depending on the application, the polyurethanes can also be dissolved in other strongly polar solvents, such as dimethylformamide, N-methylpyrrolidone, dimethyl sulfoxide or ethylglycol acetate. It is also possible to mix the stated solvents with aromatics, such as toluene, xylene and esters, such as ethyl or butyl acetate.

Further known additives for improving the magnetic layer can be added to the dispersions. Examples of such additives are fatty acids, polycarboxylic acids, mono-, di or polysulfonic acids, phosphoric acids and mixtures thereof or esters of salts with metals of the first to fourth group of the Period Table, as well as waxes, lecithins, silicone oils, fluorocarbons, and in addition fillers, such as carbon black, graphite, powdered quartz and/or nonmagnetizable silicate-based powder. In general, such additives are present in a total amount of less than 10% by weight, based on the magnetic layer.

The magnetic layers are produced in a known manner. For this purpose, the magnetic material is dispersed with the compound from the group consisting of the sterically hindered phenols having aromatic amino groups, the binder, the dispersant and sufficient solvent in a dispersing apparatus, for example a tubular ball mill or a stirred ball mill, with or without further additives. To obtain the advantageous binder/pigment ratio, these components can be added to the mixture either in solid form or in the form of 10-60% strength solutions or 30-60% strength dispersions. It has proven advantageous to continue dispersing until an extremely fine distribution of magnetic material is achieved, which may take from 1 to 5 days. A completely homogeneous magnetic dispersion is obtained by subsequent repeated filtration.

The magnetic dispersion is then applied to the nonmagnetizable substrate by means of a conventional coating apparatus, for example a knife coater. Suitable nonmagnetic and nonmagnetizable substrates are the conventional substrates, in particular films of linear polyesters, such as polyethylene terephthalate, in general in thicknesses of from 4 to 200 μm, in particular from 6 to 36 μm. Before the still liquid coating mixture is dried on the substrate, which is advantageously effected at from 50° to 90° C. in the course of from 10 to 200 seconds, the anisotropic magnetic particles are oriented along the intended recording direction by the action of a magnetic field. Magnetic layers can then be calendered and compacted on conventional apparatus by passing them between heated and polished rollers, if necessary at from 50° to 100° C., preferably from 60° to 80° C. The thickness of the magnetic layer is in general from 1 to 20 μm, preferably from 2 to 10 μm.

The novel recording media have substantially improved stability to the chemical decomposition due to moisture and oxidizable compounds compared with recording media whose magnetic layer does not contain the organic compound from the group consisting of the sterically hindered phenols having aromatic amino groups. This means that the undesirable decomposition which has a very adverse effect on the magnetic properties, i.e. disproportionation of the chromium dioxide into chromate and chromium(III) ions is substantially suppressed. Another advantage is that the novel recording media have improved recording properties due to increased residual induction and improved orientation of the anisotropic magnetic materials.

The Examples which follow illustrate the invention and compare it with prior art experiments. In the Examples and Comparative Experiments, parts and percentages are by weight, unless stated otherwise. The magnetic properties were measured using a vibrating sample magnetometer in a magnetic field of 100 kA/m. The coercive force $H_c$ in [kA/m], the residual induction $M_r$ and the saturation magnetization $M_m$ in [mT] and the orientation ratio Rf, i.e. the ratio of the residual induction in the playing direction to that in the crosswise direction, were determined. In addition, the stability of the magnetic recording media was investigated by measuring chromate formation by the eluate test according to DIN 38414/S4 and determination of total chromium in the stated eluate.

Base Polymer A

In a heatable reaction vessel having a capacity of 150,000 parts by volume and equipped with a stirrer and a reflux condenser, 6,600 parts of a polyester of adipic acid and butanediol (molecular weight 1,100), 730 parts of butanediol, 80 parts of trimethylolpropane and 3,862 parts of diphenylmethane 4,4'-diisocyanate were dissolved in 26,000 parts of tetrahydrofuran and the solution was heated to 55° C. The components were reacted to a final viscosity of 25 Pa.s and the mixture was then diluted to a solids content of 12.5% with 52,900 parts of tetrahydrofuran. At the same time, the reaction was stopped by adding 50 parts of diethanolamine. The K value of the resulting polymer was 63, measured as a 1% strength solution in dimethylformamide.

EXAMPLE 1

100,000 parts of steel balls, 16,000 parts of the 12.5% strength solution of the polyurethane elastomer stated in Example A, 10,000 parts of a 10% strength solution of a polyvinylformal consisting of 82% of vinylformal, 12% of vinyl acetate and 6% of vinyl alcohol units, 135 parts of N-tallow fat-1,3-diaminodioleate, 270 parts of zinc stearate, 40 parts of polyisobutene ($C_{24}$–$C_{28}$), 135 parts of 2,6-di-tert-butyl-p-cresol and 13,500 parts of a ferromagnetic chromium dioxide ($H_c$=40 kA/m) having a mean particle size of 0.5 μm and a length/width ratio of 4:1 and 4,500 parts of tetrahydrofuran were introduced into a steel ball mill having a capacity of 100,000 parts by volume, and dispersing was carried out for about 190 hours. The dispersion was then filtered under pressure through a filter having a pore diameter of 5 μm. A 20 μm thick polyethylene terephthalate film was coated with the dispersion using a knife coater and, after passing through a magnetic field, the coating was dried at from 60° to 100° C. The magnetic layer was compacted and calendered by passing it between heated rollers (70° C., nip pressure 200 kg/cm). The resulting thickness was 5 μm. The coated film was then slit into 3.81 mm wide tapes.

The results are shown in the Table.

COMPARATIVE EXPERIMENT 1

The procedure described in Example 1 was followed, except that 2,6-di-tert-butyl-p-cresol was not added.

EXAMPLE 2

The procedure described in Example 1 was followed, except that N-isopropyl-N'-phenyl-p-phenylenediamine was used instead of 2,6-di-tert-butyl-p-cresol.

EXAMPLE 3

The procedure described in Example 1 was followed, except that the Al salt of N-nitrosocyclohexylhydroxylamine was used instead of 2,6-di-tert-butyl-p-cresol.

EXAMPLE 4

The procedure described in Example 1 was followed, except that 200 parts of disalicylidene-N-methyldiisopropylenediamine were used instead of 135 parts of 2,6-di-tert-butyl-p-cresol.

EXAMPLE 5

100,000 parts of steel balls, 5,000 parts of the 12.5% strength solution of the polyurethane elastomer stated in Example A, 3,000 parts of a 10% strength solution of a polyvinylformal, consisting of 82% of vinylformal, 12% of vinyl acetate and 6% of vinyl alcohol units, 135 parts of N-tallow fat-1,3-diaminodioleate, 270 parts of zinc stearate, 40 parts of polyisobutene ($C_{24}$–$C_{28}$), 185 parts of 2-(2-hydroxy-5-methylphenyl)-2H-benzotriazole and 13,500 parts of a ferromagnetic chromium dioxide pigment having a mean particle size of 0.5 μm and a length/width ratio of 4:1 and 4,500 parts of tetrahydrofuran were introduced into a steel ball mill having a capacity of 100,000 parts by volume, and dispersing was carried out for 70 hours. Thereafter, 11,000 parts (12.5% strength) of polymer A and 7,000 parts of the stated 10% strength polyvinylformal solution were added and dispersing was continued for a further 20 hours. The dispersion was then removed from the mill and filtered under pressure through a filter having a pore diameter of 5 μm. After the filtration process, 17 g of a 50% strength solution of a triisocyanate, obtained from 3 moles of toluylenediisocyanate and 1 mole of trimethylolpropane, were added per kg of dispersion with vigorous stirring. The dispersion was then applied to an 8 μm thick polyethylene terephthalate film by means of a conventional knife coater. The coated film was passed through a magnetic field to orient the magnetic particles and then dried at from 50° to 90° C. After drying, the magnetic layer was compacted and calendered, so that it was 5 μm thick. The coated film was then slit into 3.8=1 mm wide tapes.

The results are shown in the Table.

EXAMPLE 6

The procedure described in Example 5 was followed, except that 2,4-bis-(n-octylthio)-6-(4-hydroxy-3,5-di-tert-butylanilino)-1,3,5-triazine was added instead of 2-(2-hydroxy-5-methylphenyl)-2H-benzotriazole.

TABLE

| | Magnetic properties | | | Eluate value | |
|---|---|---|---|---|---|
| | $H_c$ [kA/m] | $M_m$ [mT] | Rf | [mg $CrO_3$/ 1 $H_2O$] | Total chromium [mg Cr/1 $H_2O$] |
| Example 1 | 40.1 | 168 | 2.8 | 1.5 | 0.7 |
| Comparative Experiment 1 | 40.5 | 172 | 2.8 | 26.4 | 14 |
| Example 2 | 40.5 | 173 | 2.7 | 2.8 | 1.0 |

TABLE -continued

| | Magnetic properties | | | Eluate value | |
|---|---|---|---|---|---|
| | $H_c$ [kA/m] | $M_m$ [mT] | Rf | [mg $CrO_3$/ 1 $H_2O$] | Total chromium [mg Cr/1 $H_2O$] |
| Example 3 | 40.1 | 170 | 2.9 | 2.1 | 1.0 |
| Example 4 | 40.3 | 165 | 2.7 | 1.4 | 0.8 |
| Example 5 | 40.4 | 168 | 3.1 | 1.9 | 1.0 |
| Example 6 | 40.4 | 165 | 3.0 | 1.3 | 0.8 |

We claim:
1. A magnetic recording medium having improved stability in the presence of moisture and oxidizable compounds which comprises:
   a non-magnetic substrate, and
   at lease one firmly adhering magnetizable layer, said magnetizable layer containing ferromagnetic chromium dioxide particles dispersed in a polymeric binder and containing from 0.1 to 8% by weight, based on the amount of ferromagnetic chromium dioxide in the binder, of an organic stabilizer distributed in the binder, said stabilizer being selected from the group consisting of 2,6-di-tert.-butyl-p-cresol, N-isopropyl-N'-phenyl-p-phenylenediamine, Al salt of N-nitrosocyclohexylhydroxylamine, disalicylidene-N-methyldiisopropylenediamine, 2-(2-hydroxy-5-methylphenyl)-2H-benzotriazole and 2,4-bis-(n-octylthio)-6-(4-hydroxy-3,5-di-tert.-butylanilino)-1,3,5-triazine.
2. The magnetic recording medium of claim 1, wherein the stabilizer is 2-(2-hydroxy-5-methylphenyl)-2H-benzotriazole.

* * * * *